United States Patent
Kuno et al.

(10) Patent No.: US 6,760,695 B1
(45) Date of Patent: Jul. 6, 2004

(54) AUTOMATED NATURAL LANGUAGE PROCESSING

(75) Inventors: Susumu Kuno, Belmont, MA (US); Glenn A. Akers, Belmont, MA (US)

(73) Assignee: Logovista Corporation, Tokyo (JP)

( * ) Notice: Subject to any disclaimer, the term of this patent is extended or adjusted under 35 U.S.C. 154(b) by 0 days.

(21) Appl. No.: 09/171,185

(22) PCT Filed: Jun. 17, 1996

(86) PCT No.: PCT/US96/10283

§ 371 (c)(1), (2), (4) Date: Oct. 14, 1998

(87) PCT Pub. No.: WO97/40453

PCT Pub. Date: Oct. 30, 1997

Related U.S. Application Data

(63) Continuation-in-part of application No. PCT/US96/05567, filed on Apr. 23, 1996, and a continuation-in-part of application No. 07/938,413, filed on Aug. 31, 1992, now Pat. No. 5,528,491, said application No. PCT/US96/05567, is a continuation-in-part of application No. 07/938,413.

(51) Int. Cl.[7] .......................... G06F 17/27; G06F 17/28
(52) U.S. Cl. ............................................... 704/9; 704/2
(58) Field of Search ........................... 704/2, 9, 3, 4–5, 704/6–7; 707/536, 535

(56) References Cited

U.S. PATENT DOCUMENTS

| | | | |
|---|---|---|---|
| 4,791,587 A | 12/1988 | Doi ................................. 704/2 |
| 4,805,100 A | 2/1989 | Ozeki .............................. 704/1 |
| 4,833,611 A | 5/1989 | Fukumochi et al. ........... 704/5 |
| 4,916,614 A | 4/1990 | Kaji et al. ....................... 704/2 |
| 4,958,285 A | 9/1990 | Tominaga ....................... 704/9 |
| 4,964,044 A | 10/1990 | Kumano et al. ................ 704/2 |
| 4,980,829 A | 12/1990 | Okajima et al. ................ 704/7 |
| 4,984,178 A | 1/1991 | Hemphill ........................ 704/9 |
| 5,029,085 A | 7/1991 | Ito .................................. 704/2 |
| 5,060,155 A | 10/1991 | van Zuijlen .................... 704/9 |
| 5,136,503 A | 8/1992 | Takagi et al. ................... 704/2 |
| 5,214,583 A | 5/1993 | Miike et al. .................... 704/2 |
| 5,225,981 A * | 7/1993 | Yokogawa ...................... 704/9 |
| 5,243,520 A | 9/1993 | Jacobs et al. ................... 704/9 |
| 5,321,607 A | 6/1994 | Fukumochi et al. ........... 704/4 |
| 5,448,474 A | 9/1995 | Zamora .................... 364/419.1 |
| 5,497,319 A | 3/1996 | Chong et al. ................... 704/2 |
| 5,634,134 A * | 5/1997 | Kumai et al. ................ 715/536 |
| 5,649,215 A * | 7/1997 | Itoh ................................ 704/3 |
| 5,799,268 A * | 8/1998 | Boguraev ....................... 704/9 |

FOREIGN PATENT DOCUMENTS

EP 0357344 8/1989 ........... G06F/15/38

OTHER PUBLICATIONS

Stanley Y.W. Su, "Heuristic Algorithms For Path Determination In A Semantic Network", IEEE Cat. No. 0730–3157/90/0000/0587, 1990, pp. 587–592.

Spiegel, M.R., "Theory and Problems Of Probability and Statistics", Schaum's Outline Series, Chapter 3, p. 76.

Cormen, T.H. et al., *Introduction To Algorithms*—16–Dynamic Programming, The Mit Press/Mcgraw–Hill Book Company, pp. 301–314.

(List continued on next page.)

*Primary Examiner*—Patrick N. Edouard
(74) *Attorney, Agent, or Firm*—Daly, Crowley & Mofford, LLP

(57) ABSTRACT

An automated natural language translation system takes source natural language text (preferably in Japanese) and translates them into a target natural language (preferably English). The system also allows an operator to re-translate automatically selected portions of the source text. The system includes an improvement directed to transforming kanas in the source text into alphabetic letters of the target language which allows the presence of a word or phrase boundary to be recognized in the middle of a kana. The system also includes an improvement involving performing concurrently on the source text both a morphological analysis and a syntactic analysis.

12 Claims, 11 Drawing Sheets

OTHER PUBLICATIONS

Gazdar, Gerald, *Natural Language Processing In Prolog—An Introduction —To Computational Linguistics* —7.2 "Feature Structures As Graphs" Addison–Wesley Publishing Company, pp. 221–226.

Sobashima et al., *"A Corpus–based Local Context Analysis for Spoken Dialogues"*, Speech Communications, pp. 205–212.

PCT/US96/05567, International Search Report, 7 pages.

PCT/US96/10283, International Search Report, 7 pages.

Teller et al. paper, 1994, *"A Probabilistic Algorithm for Segmenting Non–Kanji Japanese Strings"*, Natural Language Processing, pp. 742–747.

Abe et al. paper, 1986, *"A Kana–Kanji Translation System for Non–Segmented Input Sentences Based on Syntactic and Semantic Analysis"*, Central Research Labratory, Hitachi, Ltd., pp. 280–285.

* cited by examiner

AUTOMATED NATURAL LANGUAGE PROCESSING

CROSS-REFERENCE TO RELATED APPLICATIONS

This is a continuation-in-part of U.S. patent application Ser. No. 07/938,413 which was filed with the U.S. Patent and Trademark Office on Aug. 31, 1992 now U.S. Pat. No. 5,528,491. This also is a continuation-in-part of international patent application No. PCT/US96/05567 which was filed with the U.S. Receiving Office on Apr. 23, 1996 via the Patent Cooperation Treaty (PCT) designating Japan and the U.S. PCT/US96/05567 is itself a continuation-in-part of Ser. No. 07/938,413.

TECHNICAL FIELD

The invention relates to automated natural language processing in order to translate automatically from one natural language into another natural language, preferably Japanese to English.

BACKGROUND INFORMATION

Various schemes for the machine-based translation of natural language have been proposed. Typically, the system used for translation includes a computer which receives input in one language and performs operations on the received input to supply output in another language. This type of translation has been an inexact one, and the resulting output can require significant editing by a skilled operator. The translation operation performed by known systems generally includes a structural conversion operation. The objective of structural conversion is to transform a given parse tree (i.e., a syntactic structure tree) of the source language sentence to the corresponding tree in the target language. Two types of structural conversion have been tried, grammar-rule-based and template-to-template.

In grammar-rule-based structural conversion, the domain of structural conversion is limited to the domain of grammar rules that have been used to obtain the source-language parse tree (i.e., to a set of subnodes that are immediate daughters of a given node). For example, given > VP=VT01+NP (a VerbPhrase consists of a SingleObject Transitive Verb and a NounPhrase, in that order)
>
> and
>
> Japanese: 1+2=>2+1 (Reverse the order of VT01 and NP), each source-language parse tree that involves application of the rule is structurally converted in such a way that the order of the verb and the object is reversed because the verb appears to the right of its object in Japanese. This method is very efficient in that it is easy to find out where the specified conversion applies; it applies exactly at the location where the rule has been used to obtain the source-language parse tree. On the other hand, it can be a weak conversion mechanism in that its domain, as specified above, may be extremely limited, and in that natural language may require conversion rules that straddle over nodes that are not siblings.

In template-to-template structural conversion, structural conversion is specified in terms of input/output (I/O) templates or subtrees. If a given input template matches a given structure tree, that portion of the structure tree that is matched by the template is changed as specified by the corresponding output template. This is a very powerful conversion mechanism, but it can be costly in that it can take a long period of time to find out if a given input template matches any portion of a given structure tree.

SUMMARY OF THE INVENTION

The automated natural language translation system according to the invention has many advantages over known machine-based translators. After the system automatically selects the best possible translation of the input textual information and provides the user with an output (preferably a Japanese language translation of English-language input text), the user can then interface with the system to edit the displayed translation or to obtain alternative translations in an automated fashion. An operator of the automated natural language translation system of the invention can be more productive because the system allows the operator to retain just the portion of the translation that he or she deems acceptable while causing the remaining portion to be retranslated automatically. Since this selective retranslation operation is precisely directed at portions that require retranslation, operators are saved the time and tedium of considering potentially large numbers of incorrect, but highly ranked translations. Furthermore, because the system allows for arbitrary granularity in translation adjustments, more of the final structure of the translation will usually have been generated by the system The system thus reduces the potential for human (operator) error and saves time in edits that may involve structural accord, and tense changes. The system efficiently gives operators the full benefit of its extensive and reliable knowledge of grammar and spelling.

The automated natural language translations system's versatile handling of ambiguous sentence boundaries in the source language, and its powerful semantic propagation provide further accuracy and reduced operator editing of translations. Stored statistical information also improves the accuracy of translations by tailoring the preferred translation to the specific user site. The system's idiom handling method is advantageous in that it allows sentences that happen to include the sequence of words making up the idiom, without intending the meaning of the idiom, to be correctly translated. The system is efficient but still has versatile functions such as long distance feature matching. The system's structural balance expert and coordinate structure expert effectively distinguish between intended parses and unintended parses. A capitalization expert effectively obtains correct interpretations of capitalized words in sentences, and a capitalized sequence procedure effectively deals with multiple-word proper names, without completely ignoring common noun interpretations.

In one aspect, the invention is directed to an improvement of the automated natural language translation system, wherein the improvement relates to parsing input textual information in a source natural language (preferably Japanese) by transforming at least some of the kanas in the input textual information into alphabetic letters of a target natural language (preferably English) thereby allowing the presence of a word or phrase boundary to be recognized in the middle of a kana. The input textual information includes kanjis and kanas wherein kanjis are ideograms which each has some semantic content and kanas are syllabic characters which each represents a sound without any inherent meaning. The source natural language is one which uses ideograms and syllabic characters but does not mark word or phrase boundaries, as is the case with Japanese.

In another aspect, the invention is directed to another improvement of the automated natural language translation system, wherein the improvement relates to parsing input textual information in a source natural language (preferably Japanese, Korean, or Chinese) by performing concurrently on the input textual information a morphological analysis and a syntactic analysis. The source natural language is one without identifiers marking word or phrase boundaries, as is the case with Japanese, Korean, and Chinese.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
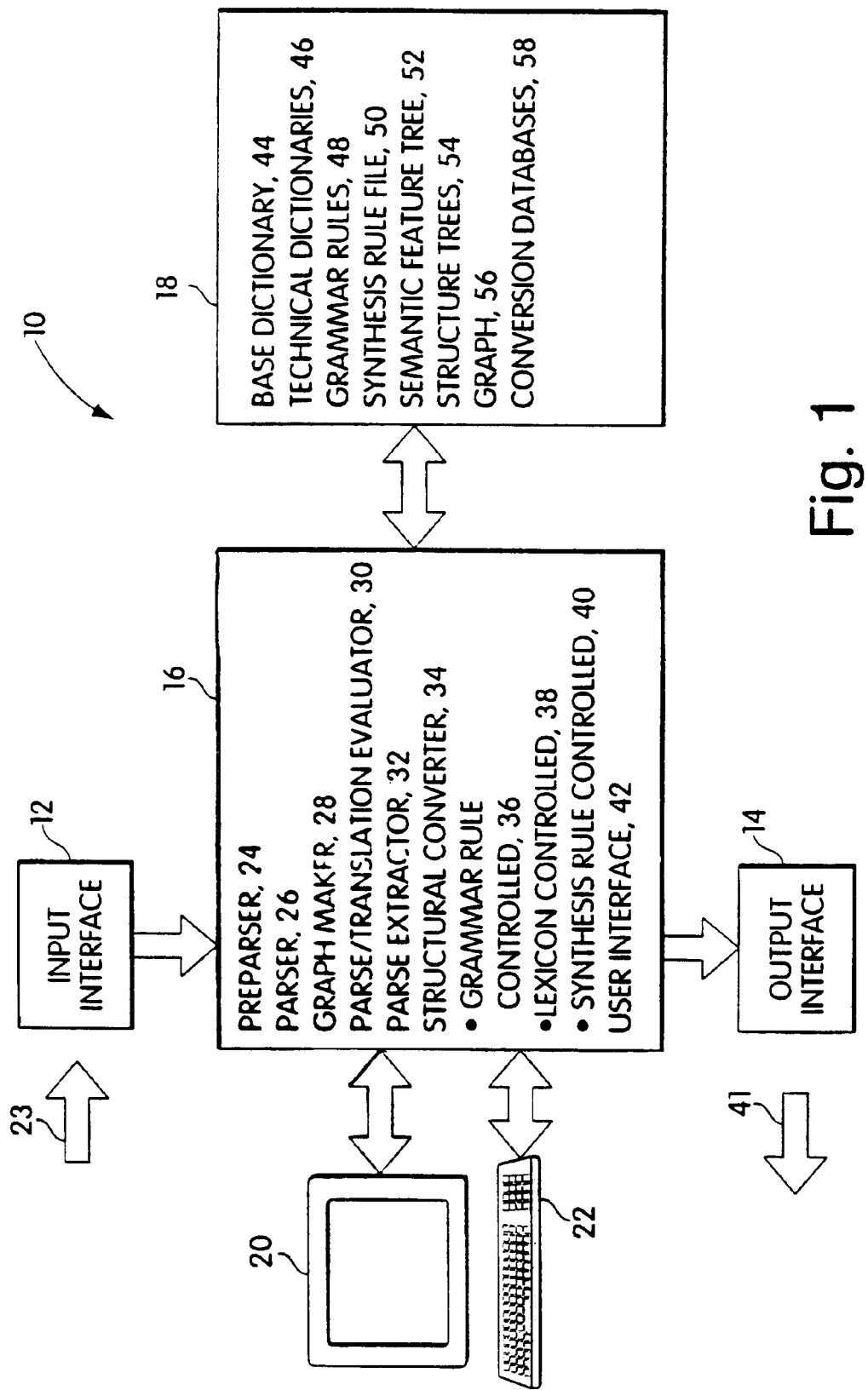
FIG. 1 is a block diagram illustrating a system for performing automated translation of natural language.

A general description of an automated natural language translations system according to the invention is first provided below without reference to any of the drawings. After the general description of the system, reference will be made to the various drawings.

An automated natural language translation system can translate from a source natural language to a target natural language. In one preferred embodiment, the system translates from English to Japanese. In another preferred embodiment, the system translates from Japanese to English. The system comprises means for receiving and storing the source natural language, a translation engine for creating a translation into the target natural language, means for displaying the translation to a user, and means for obtaining for a user and displaying to a user alternative translations. In one embodiment of the system, the translation engine includes a preparser, a parser, a graph maker, an evaluator, a graph scorer, a parse extractor, and a structural converter. The preparser examines the input text and resolves any ambiguities in input sentence boundaries. The preparser then creates and displays the input text in a parse chart seeded with dictionary entries. The parser parses the chart to obtain possible syntactic categories for the input text. The graph maker produces a graph of the possible syntactic interpretations of the input text based on the parse chart. The graph includes nodes and subnodes which are associated with possible interpretations of the input text. The evaluator, which comprises a series of experts, evaluates the graph of the possible interpretations and adds expert weights to the nodes and subnodes of the graph. The graph scorer uses the expert weights to score the subnodes, and the graph scorer then associates the N best scores with each node. The parse extractor assigns a parse tree structure to the preferred interpretation as determined by the graph scorer. The structural converter performs a structural conversion operation on the parse tree structure to obtain a translation in the target language.

In the following three paragraphs, a description is provided of how: (a) the graph scorer combines the expert weights to compute a final weighted score for each subnode; (b) the graph scorer combines the subnode scores to arrive at a final node score; and (c) linguistic information is propagated through the tree of nodes and subnodes.

To compute the final weighted score for each subnode, the graph scorer associates a constant value with each subnode. An analysis of the linguistic information associated with each subnode determines the subnode score See, for example, FIG. 8 where a series of expert evaluators examine the linguistic information stored at each node and subnode. The graph scorer adds together the individual weighted scores for each expert to obtain a final weighted average for a particular node or subnode. The combination of a plurality of weighted scores into a single weighted average score is a standard problem in computer science. One method that can be used is to multiply each expert result by a constant number (weight) assigned to that expert. The weight assigned to each expert is a matter of design choice. The designer can choose the priority (weight) to assign each expert. The weighted average is the summation of a series of numbers wherein each number is multiplied by a constant. For example, $$\text{weighted average} = (w_1)(x_1) + (w_2)(x_2) + \ldots + (w_n)(x_n)$$

where the weights, $w_1, w_2, \ldots w_n$, are all nonnegative and add up to 1. See, for example, Spiegel, *Theory and Problems of Probability and Statistics* 76 (McGraw-Hill, Inc. 1975) which discusses the use of weighted averages in the context of statistical expectations.

To combine subnode scores to obtain a final node score, the graph scorer can propagate the subnode scores from the bottom of the graph up to the top of the graph. Given the graph, wherein each node has a set of N scores, it is possible to determine one or more propagation methods. One technique which can be used to propagate the subnode scores is memoization which is a type of dynamic-programming used to solve optimization problems. The solution to optimization problems can involve many possible values (outcomes). The task is to find the optimal value. The algorithm used in optimization solves every subsubproblem just once and saves the outcome, thus avoiding the need to recompute the answer every time the subsubproblem is encountered. For a more detailed explanation of memoization as applied to optimization problems, see, for example, Cormen et al., *Introduction to Algorithms* 301–314 (McGraw-Hill Book Co. 1990). The method described at pages 301, 302, and 312 of *Introduction to Algorithms* is one method that can be used for propagating subnode score information through the graph.

In propagating linguistic information through the tree, the semantic propagation part of the system operates to propagate semantic information from smaller constituents to the larger constituents that they comprise. Semantic propagation applies to the four classes of syntactic categories (SEMNP, SEMVP, SEMADJ, and VERB) used in the parsing operation. Before semantic propagation can occur, the linguistic information stored at the nodes must be analyzed. The analysis of the semantic information stored at the nodes is guided by a set of rules that tell from examining the noun-like and verb-like constituents in a grammar rule which selectional restriction slots of the verb-like constituents apply to which noun-like objects. Gerald Gazdar discusses in his text *Natural Language Processing In Prolog* (Addison-Wesley Publishing Co., 1989) a set of rules which can be used to analyze the semantic information stored at the nodes in a directed acyclic graph similar to that disclosed in the specification. Gazdar discusses the use of feature matching to match information on adjacent nodes. Gazdar states that feature matching involves equations that say that certain > features appearing on one node must be identical to the features appearing on another. Most current work assumes a principle that is responsible for equating one class of feature specifications as they appear on the mother category and the daughter which manifests the morphology associated with those features. This daughter is known as the "head" of the phrase. Most phrases only have a single head. Thus, for example, a verb phrase inherits the tense of its verb since the latter is the head of the verb phrase. There is no straightforward way of specifying this principle on a grammar-wide basis with the notational resources that we have used so far, but we can stipulate the effects of the principle on a rule-by-rule basis quite simply if we assume that the relevant features are all to be found on a single branch of the DAG. Let us call the label on this branch head. Then we can write a typical VP rule as follows:
> VP ---->V NP PP
> <V head>=<VP head>
> This requires that the value of the head feature on the V and that on the mother VP be identical.

The rules discussed in Gazdar can be easily adapted for each of the syntactic categories discussed herein. The linguistic information assigned to each node using Gazdar's rules can be propagated through the tree using memoization techniques.

Thus, summarizing the previous three paragraphs, the weighted average is one method of determining the subnode score, each subnode score can be propagated through the graph using known memoization techniques as applied to optimization problems, and the strategy discussed in Gazdar's text can be used to analyze the linguistic information stored at each node and this linguistic information can be propagated through the parse tree chart using memoization techniques.

The automated natural language translation system can perform automated re-translation functions after the initial automatic translation. That is, after the system automatically selects the best possible translation of the input textual information and provides the user with an output (preferably a Japanese language translation of the input English text, or a Japanese-to-English translation), the user can then interface with the system to edit the displayed translation or to obtain alternative translations in an automated fashion.

The automated natural language translation system uses a linguistic model which breaks a sentence into substrings. A substring is one or more words which occur in the order specified as part of the sentence. For instance, substrings of "The man is happy" include "The," "The man," "man is happy," "is," and "The man is happy" itself, but not "is man," "man man," and "The is."

Different linguistic models classify substrings in various ways and in different levels of detail. For instance, in "They would like an arrow," "an arrow" is typically classified as a noun phrase (NP). Some models would also classify "an arrow" with syntactic features (for instance, it is a singular noun phrase), and semantic features (it refers to a weapon). If the phrase is ambiguous, there may be two or more ways of classifying it. For instance, "an arrow" can also refer to a symbol with an arrow-like shape. When linguistic models provide a method for resolving ambiguity, they usually do so by combining smaller units into larger units. When evaluating a larger unit, these models consider only a portion of the information contained in the larger unit.

In an exemplary embodiment of the system, the semantic property of "an arrow" (symbol vs. weapon) is used in evaluating the verb phrase "like an arrow" in the sentence "They would like an arrow." In contrast, if the syntax of the phrase "an arrow" were changed as in "He shot it with an arrow," the semantic property of "an arrow" is not used in evaluating the verb phrase "shot it with an arrow."

For any substring of a sentence interpreted in a single way with regard to a specific linguistic model (an interpreted substring), exported properties exist. Exported properties are all properties used to evaluate the combination of an interpreted substring with other units to form larger substrings. An export is an interpreted substring interpreted together with its exported properties. Properties that are contained within the interpreted substring but not exported are called substructures.

The parser of the system includes a grammar database. The parser finds all possible interpretations of a sentence using grammatical rules. The grammar database consists of a series of context-free phrase structure rules of the form X=A1 A2 . . . An. X is composed of, or made from, A1 A2 . . . An and is referred to as a higher node of lower nodes (subnodes) A1 through An.

The graph maker of the system graphically represents the many possible interpretations of a sentence. Each node of the graph corresponds to an export of some substring. In one embodiment of the system, a single export is represented by a single node. The graph contains arcs which emanate from the nodes associated with an export. The arcs represent the substructure of the export based on the application of grammar rules. The graph may depict at least two types of arcs: (1) a unary arc which points to a single different export of the same substring; (2) a binary arc which includes a pair of pointers which points to two exports, the substrings of which when concatenated form the substring of the original export. Note that the formulation described in (2) assumes a grammar in Chomsky normal form. Amended claim 35 applies to grammars not in Chomsky normal form by rephrasing type (2) to reflect an arc having an N-tuple of pointers, pointing to $\underline{N}$ exports.

The graph also includes a single starting export $\underline{S}$ from which all portions of the graph can be reached by following a series of arcs. The starting export corresponds to the entire sentence.

Multiple arcs emanate from a node if and only if the same export can be composed of one or more exports (the pair of pointers in a binary arc is not considered multiple arcs for this purpose). Multiple arcs point to a node if and only if that export is a component of multiple exports. A node with no arcs projecting from it corresponds to a dictionary entry assigned to the substring.

A plurality of linguistic experts assign a numerical score to a set of exports. The linguistic experts apply the score to each node of the graph. In one embodiment of the system, a scoring array (where each element of the array is a weight to multiply by a particular expert's score) is a fixed length "$\underline{N}$" of floating point numbers for any given sentence.

The score is evaluated by a scoring module which may be integrated with the graph-making engine and/or the parser. Scores are computed for all exports that make up a higher export. The score for the higher export is computed as the sum of the exports that make up the higher level export and the scores of any experts that apply to the combination such as a score assigned by the structural balance expert.

The order in which nodes are visited and scored is a standard depth-first graph-walking algorithm. In this algorithm, nodes that have been scored are marked and are not scored again. During the scoring process, the scoring module evaluates dictionary entry nodes before evaluating any of the higher unit nodes. Each dictionary entry gives rise to a single score.

Multiple scores result where there are multiple ways of making an export, i.e., $\underline{k}$ ways of making the export result in $\underline{k}$ possible scores. Multiple scores are handled as follows:

(1) For a unary rule, each of the $\underline{k}$ scores of the lower export is added to the expert values that apply to the unary rule, and the resulting vector of $\underline{k}$ scores is associated with the parent export.

(2) For a binary rule, assume that the left child has $\underline{g}$ scores and the right child has $\underline{h}$ scores. Then a total of $\underline{g}$ times $\underline{h}$ scores are computed by adding each of the left child's scores to each of the right child's scores, and in addition, adding the expert values that apply to the binary rule. When $\underline{g}$ times $\underline{h}$ exceeds $\underline{N}$, only the $\underline{N}$ best scores are kept with the parent node.

(3) When a node's export can be created in multiple ways, at most $\underline{N}$ scores are added to that node's score list, the best scores being kept.

When scoring is complete, the above methods assure that each export has associated with its node a set of $\underline{g}$ scores ($\underline{g}$ ranging from $\underline{1}$ to $\underline{N}$ which represent the $\underline{g}$ most likely ways (relative to the linguistic model) of making the export, including all substructure properties which are not represented in the export. In the special case of the root node $\underline{S}$, the scoring method gives rise to the $\underline{g}$ most likely ways of making the sentence.

Each score in each score list described above has an associated pointer. The pointer provides information to indicate which score(s) of the score list of lower export(s) were combined to produce the higher level score. By following the respective pointers, the $\underline{g}$ most likely interpretations of the sentence can be extracted as unambiguous parse trees.

Further details of the automated natural language translation system will now be disclosed with reference to FIGS. 1–9. Various improvements according to the invention are described thereafter with reference to FIGS. 10, 11, and 12.

Figure 2:
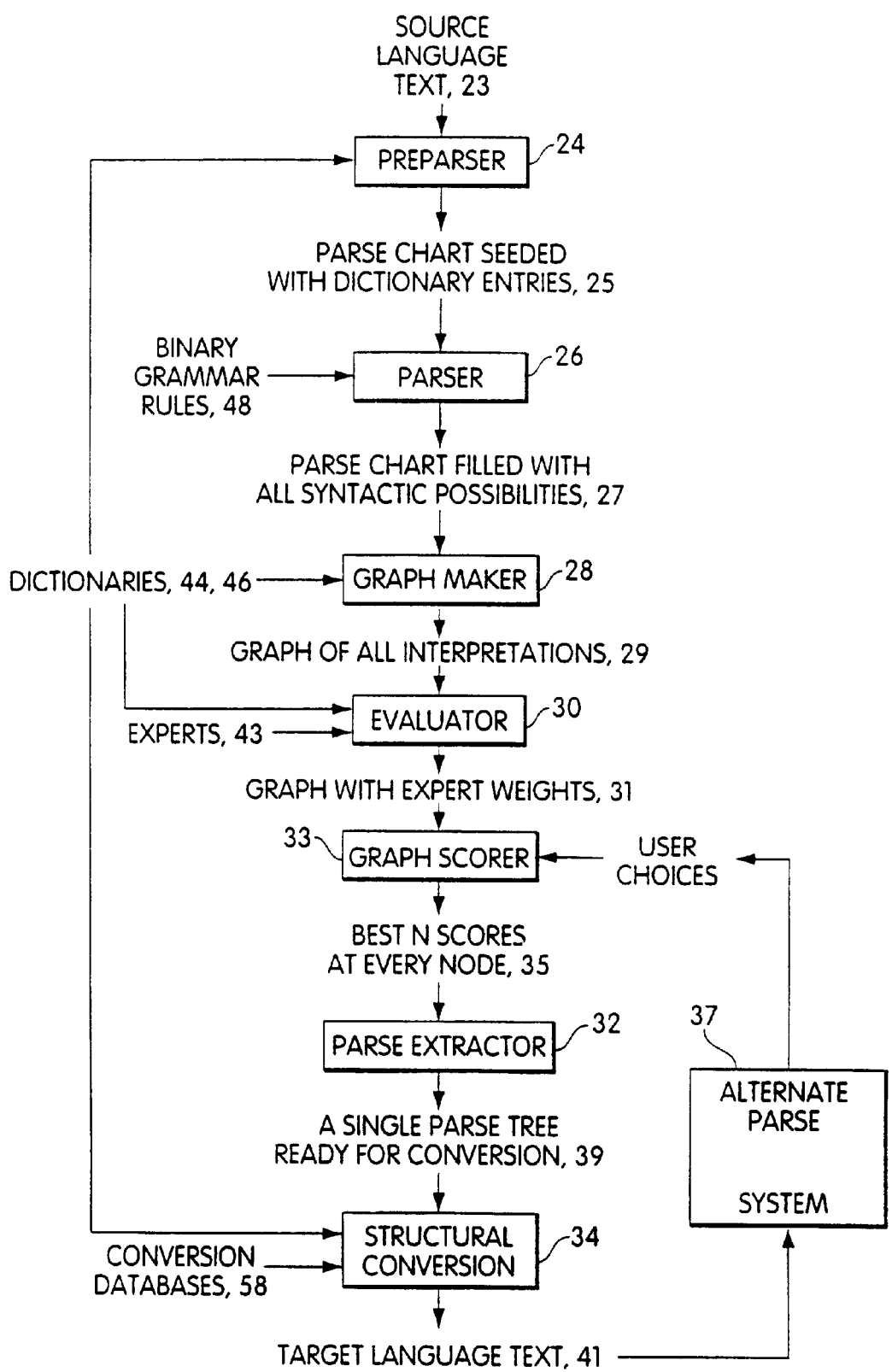
FIG. 2 is a data flow diagram illustrating overall functioning of the system of FIG. 1.

Referring to FIGS. 1 and 2, an automated natural language translation system 10 according to the invention includes an input interface 12, a translation engine 16, storage 18, a user input device 22, a display 20, and an output interface 14. The input interface is constructed to receive a sequence of text in a source language, such as English or Japanese. The input interface may comprise a keyboard, a voice interface, or a digital electronic interface, such as a modem or a serial input. The translation engine performs translation operations on the source text, in conjunction with data in storage. The translation engine may be comprised entirely of hardwired logic circuitry, or it may contain one or more processing units and associated stored instructions. The engine may include the following elements, or parts of them: A preparser 24, a parser 26, a graph maker 28, a parse/translation evaluator 30, a parse extractor 32, a structural converter 34, and a user interface 42, which includes an alternate parse system 37. The structural converter may comprise a grammar rule controlled structural converter 36, a lexicon controlled structural converter 38, and a synthesis rule controlled structural converter 40. The storage 18 may include one or more areas of disk (e.g., hard, floppy, and/or optical) and/or memory (e.g., RAM) storage, or the like. It may store the following elements, in whole or in part: a base dictionary 44, technical dictionaries 46, user-created dictionaries, grammar rules 48, synthesis rules 50, a semantic feature tree 52, structure trees 54, and a graph 56. The storage 18 also is used to store input textual information in a source natural language, output textual information in a target natural language, and all sorts of information used or useful in performing the translation including one or more dictionaries, domain keywords, and grammar rules. The user input interface 22 may comprise a keyboard, a mouse, touchscreen, light pen, or other user input device, and is to be used by the operator of the system. The display may be a computer display, printer or other type of display, or it may include other means of communicating information to the operator. The output interface 14 communicates a final translation of the source text in the target language, such as Japanese. The interface may comprise a printer, a display, a voice interface, an electronic interface, such as a modem or serial line, or it may include other means for communicating that text to the end user.

Figure 3:
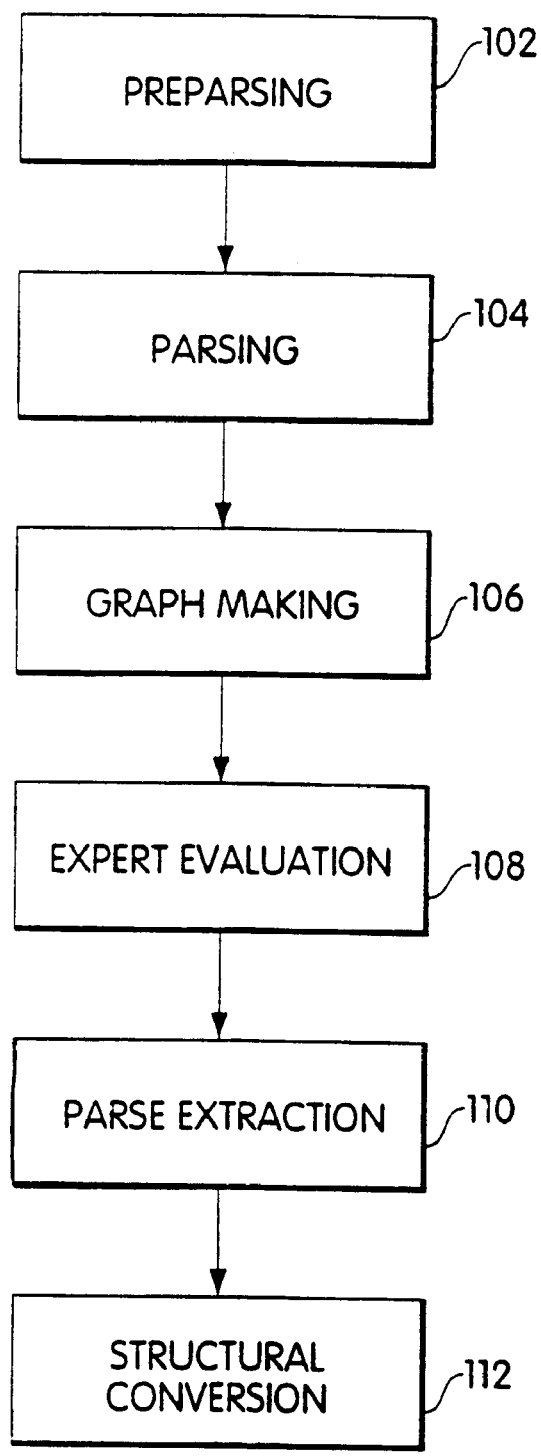
FIG. 3 is a flow diagram illustrating the operation of the system of FIG. 1.

In operation of one embodiment of the translation system of the invention, referring to FIGS. 1, 2 and 3, the preparser 24 first performs a preparsing operation (step 102) on the source text 23. This operation includes the resolution of ambiguities in sentence boundaries in the source text, and results in a parse chart seeded with dictionary entries 25. The parser 26 then parses the chart produced by the preparser (step 104), to obtain a parse chart filled with syntactic possibilities 27. The graph maker 28 produces a graph of possible interpretations 29 (step 106), based on the parse chart resulting from the parsing step. The evaluator 30, which accesses a series of experts 43, evaluates the graph of stored interpretations (step 108), and adds expert weights to the graph 31. The graph scorer 33 scores nodes and associates the N (e.g., 20) best scores with each of them 35. The parse extracter 32 assigns a parse tree structure 39 to this preferred interpretation (step 110). The structural converter 34, which accesses the conversion tables 58, then performs a structural conversion operation (step 112) on the tree to obtain a translation 41 in the target language. The user may interact with the alternate parse system 37 to obtain alternative translations.

Figure 4:
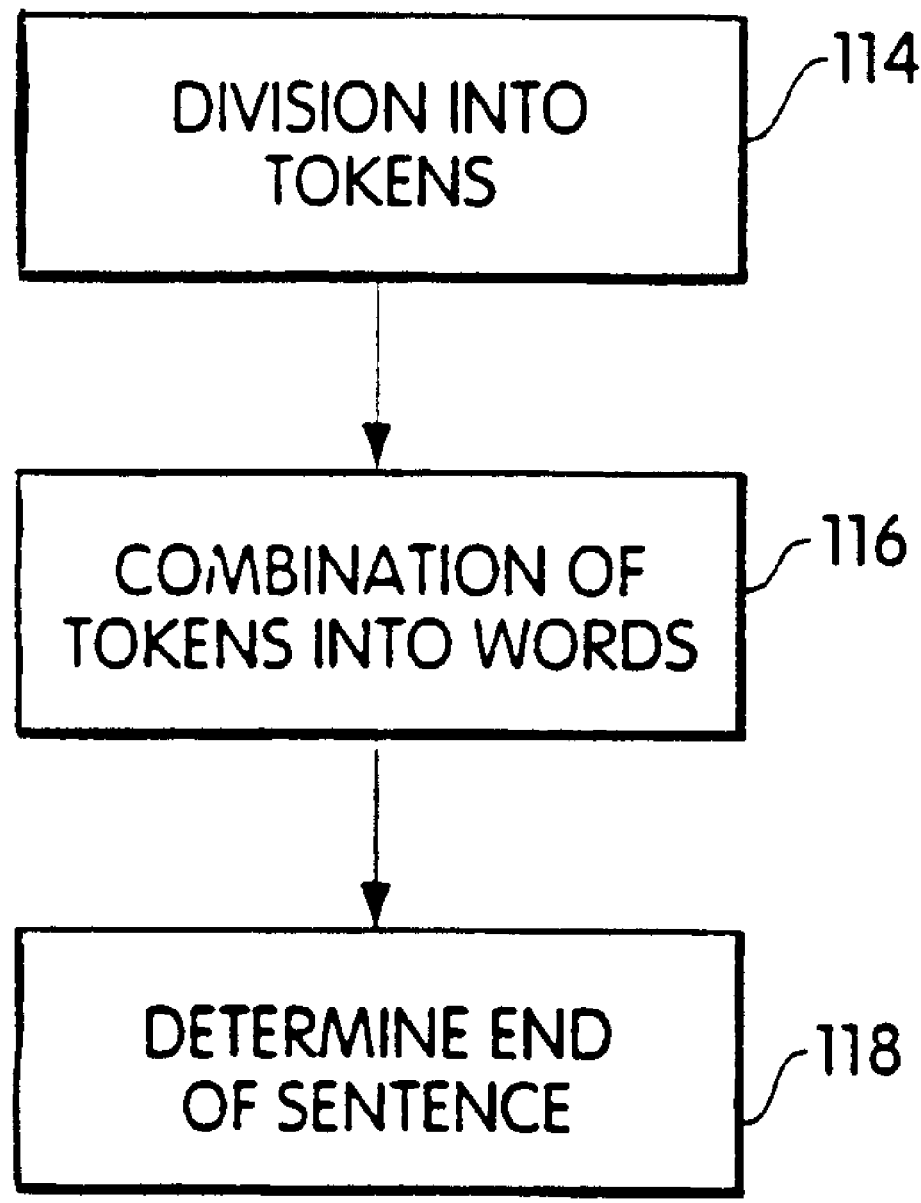
FIG. 4 is a flow diagram illustrating the operation of the end-of-sentence function of the preparser of the system of FIG. 1.

Referring to FIG. 4, the system begins the preparsing operation by dividing the input stream into tokens (step 114), which include individual punctuation marks, and groups of letters that form words. The occurrence of whitespace affects the interpretation of characters at this level. For instance, in "x - y" the "-" is a dash, but in "x-y" it is a hyphen.

The preparser then combines the tokens into words (step 116). At this level, it recognizes special constructions (e.g., internet addresses, telephone numbers, and social security numbers) as single units. The preparser also uses dictionary lookup to find groupings. For example, if "re-enact" is in the dictionary as "reenact" it will become one word in the sentence, but if it is not, then it will remain as three separate "words".

The next preparsing phase involves determining where the sentence ends (step 118). During this operation, the preparser accesses the base dictionary and the technical dictionaries, and any user-created dictionaries, as it follows a sequence of steps for each possible sentence ending point (i.e., after each word of the source text). The preparser need not perform these steps in the particular order presented, and these may be implemented as a series of ordered rules or they may be hard-coded.

Figure 5:
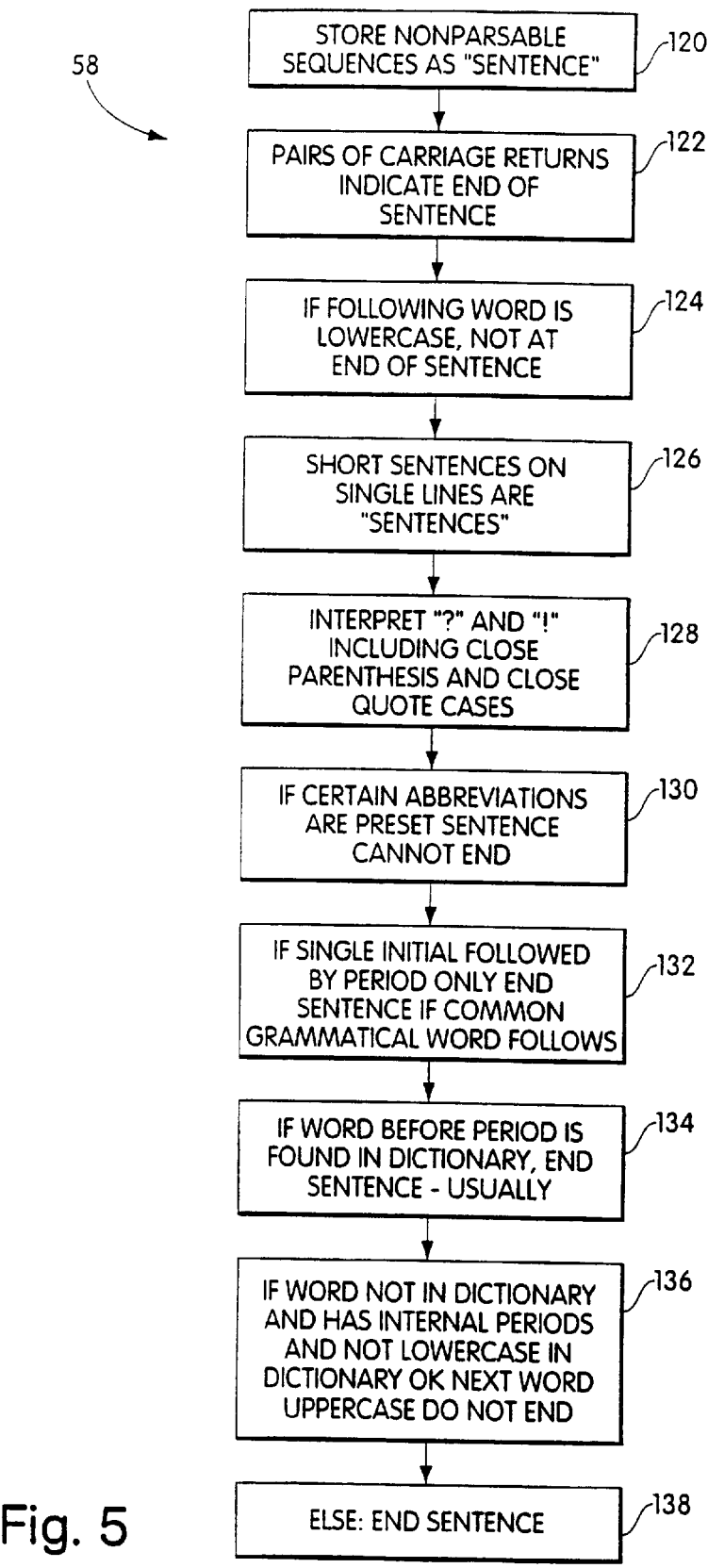
FIG. 5 is a flow diagram illustrating the operation of the parser of the system of FIG. 1.

Referring to FIG. 5, the preparser interprets and records any nonparsable sequence of characters, such as a series of dashes: "------", as a "sentence" by itself, although not one which will be translated (step 120). The preparser also requires any sequence of two carriage returns in a row to be the end of a sentence (step 122). If the first letter of the next word is a lower case letter, the preparser will not indicate the end of a sentence (step 124). If a sentence started on a new line and is short, the preparser considers it a "sentence" of its own (e.g., a title).

The preparser interprets a period, a question mark, or an exclamation mark as the end of a sentence, except in certain situations involving end parenthesis and end quotes (step 128). In the case of sentences that ends with ." or ?" or the like, the preparser uses virtual punctuation marks after the quote in addition to the punctuation before the quote. Alternatives for the underlying punctuation required for ?" are illustrated in the following examples:

The question was "What do you want?".
Did he ask the question "What do you want?"?
Are you concerned about "the other people"?

In English, each of these is likely to end with ?" The virtual punctuation marks added by the preparser indicate that before the quote there is something which can be either a question mark or nothing at all. After the quote there is something that can be either a period or a question mark. The grammatical structure of the rest of the sentence allows later processing stages to select the best choice.

The preparser may also use several further approaches in preparsing a period (steps 130, 132, 134, 136, and 138). Some abbreviations in the dictionary are marked as never beginning sentences and others as never ending sentences (step 130). These rules are always respected. For example, "Ltd" never begins a sentence and "Mr" never ends one. The preparser also will not end a sentence with a single initial followed by a period unless the next word is a common grammatical word (step 132) such as "the", "in", etc. If the word before the period is found in any dictionary, the period will end the sentence (step 134). If the word before the period is not in this dictionary, and it has internal periods (e.g., I.B.M.) and the next word is not in the dictionary in a lowercase form, or the word after that is itself uppercase, then this is not an end of sentence (step 136). In remaining cases the period does mark the end of sentence (step 138).

Referring again to FIGS. 2 and 3, once the sentence boundaries have been defined by the preparser, the parser places the words of the sentence in syntactic categories, and applies grammar rules from the grammar database to them to compute possible syntactic interpretations 25 of the sentence (step 104). These grammar rules 48 can be implemented as a series of computer readable rules that express the grammatical constraints of the language. For the English language, there may be hundreds of such rules, which may apply to hundreds of syntactic categories. To reduce the computational overhead of this operation, the different possible meanings of a word are ignored.

In the next step (step 106), the graph maker employs the dictionary to expand the results of the parser to include the different meanings of words and creates a directed acyclic graph representing all semantic interpretations of the sentence. This graph is generated with the help of a series of semantic propagation procedures, which are described below. These procedures operate on a series of authored grammar rules and, in some cases, access a semantic feature tree for semantic information. The semantic feature tree is a tree structure that includes semantic categories. It is roughly organized from the abstract to the specific, and permits the procedures to determine how semantically related a pair of terms are, both in terms of their separation in the tree and their levels in the tree. For example, "cat" and "dog" are more related than "cat" and "pudding", and hence the former pair would be separated by a smaller distance within the tree. "Animal" and "cat" are examples of words that are stored at different levels in the tree, as "animal" is a more abstract term than "cat."

Figure 9:
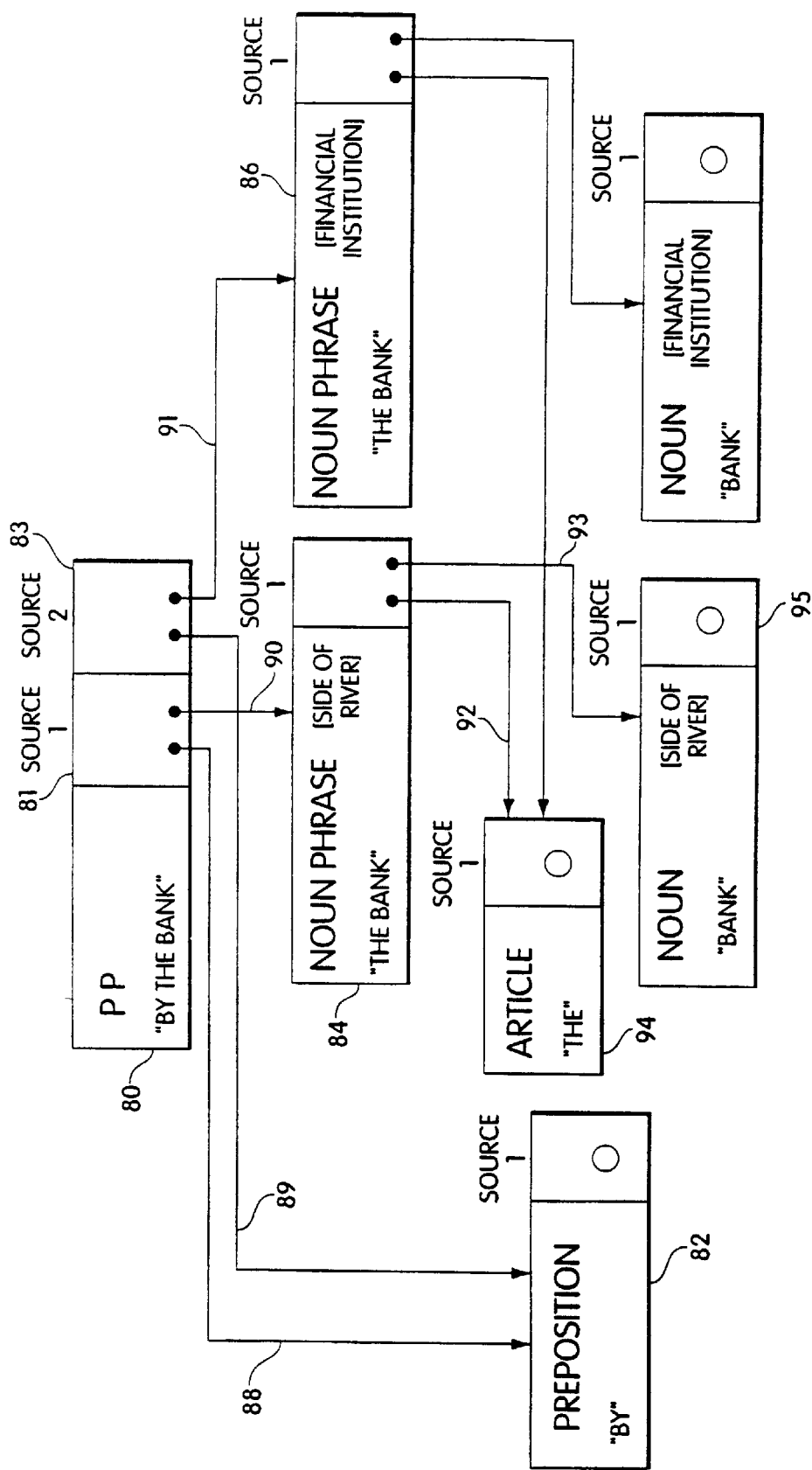
FIG. 9 is a diagram of a sample graph used by the system of FIG. 1 for the exemplary phrase "by the bank".

Referring to FIG. 9, the graph includes nodes 80 and their subnodes 82, 84, 86 linked by pointers 88, 89, 90, 91 in a manner that indicates various types of relationships. A first type of relationship in the graph is one where nodes representing phrases possess pointers to constituent word nodes or sub-phrase nodes. For example, a node 84 representing the phrase "the bank" will be linked by pointers 92, 93 to the constituent words "the" 94, and "bank" 95. A second type of relationship in the graph is where phrase interpretations possess pointers to alternate ways of making the same higher-level constituent from lower-level pieces. For example, a node 80 representing the phrase "by the bank" can have two source interpretation locations 81, 83, which each include pointers 88 & 89, 90 & 91 to their respective constituents. In this example, the different constituents would include different subnodes 84, 86 that each represent different meanings for the phrase "the bank". The structure of the graph is defined by the results of the parsing operation and is constrained by the syntax of the source sentence. The nodes of the graph are associated with storage locations for semantic information, which can be filled in during the process of semantic propagation.

The semantic propagation part of the system operates to propagate semantic information from smaller constituents to the larger constituents they comprise. It applies to four classes of the syntactic categories used in the earlier parsing operation: SEMNP (which includes noun-like objects and prepositional phrases), SEMVP (verb phrase like objects, which usually take subjects), SEMADJ (adjectives) and VERB (lexical verb-like verbs that often take objects). Other syntactic categories are ignored within a rule. The grammar rule author may also override the implicit behavior below by specific markings on rules. These specific instructions are followed first.

There are two aspects to the manner in which semantic features are propagated through the system. The first is a set of rules that tell from examining the noun-like and verb-like constituents in a grammar rule, which selectional restriction slots of the verb-like constituents apply to which noun-like objects. For instance, the rule for the verb phrase of the sentence: "I persuaded him to go" is roughly VP=VT11+ NP+VP (where VP is a verb phrase, VT11 is a type of transitive verb, and NP is a noun phrase). One exemplary default rule indicates that when a verb takes objects, selectional restrictions are to be applied to the first NP encountered to the right of the verb. Another rule says that VP restrictions on their subjects should be applied to the first NP found to the left of a VP. Together these rules make sure that "persuade him" and "him go" are both evaluated for their semantic plausibility. As mentioned before, these rules reflect the complex grammar of the English language and there may therefore be quite a few of them.

Figure 6:
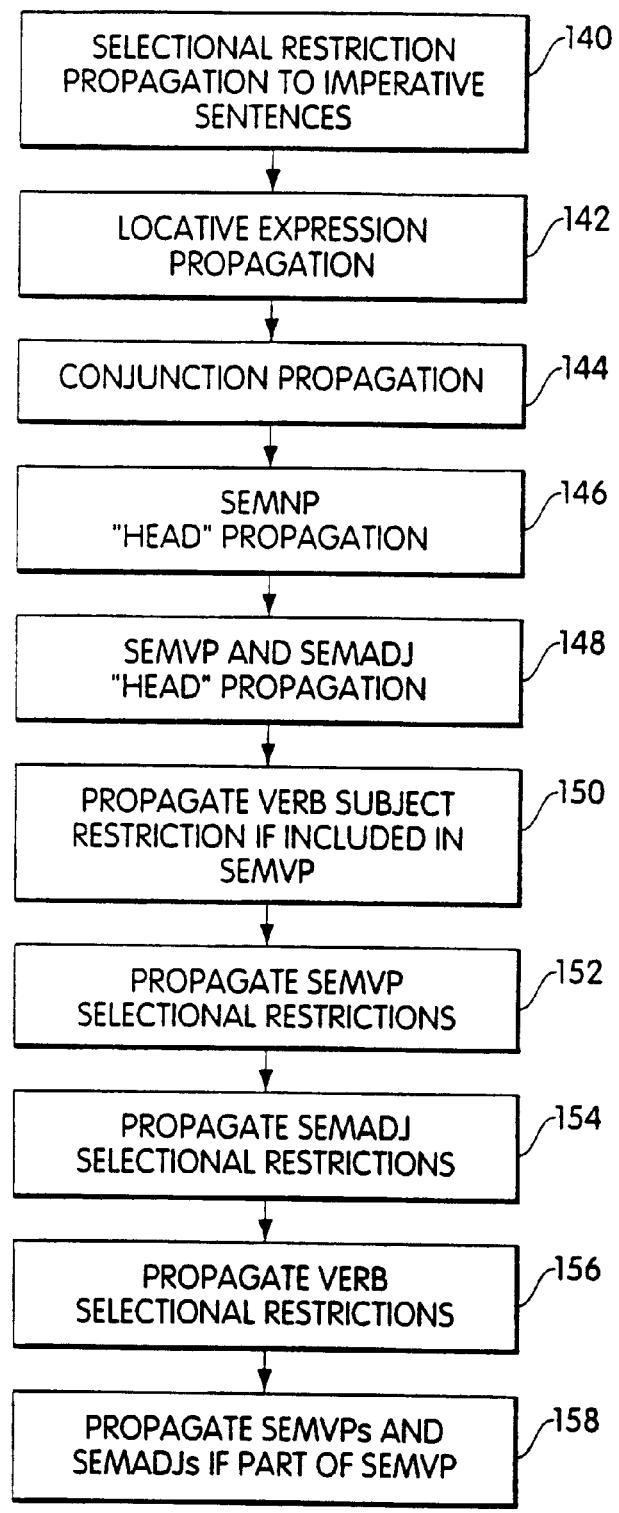
FIG. 6 is a flow diagram illustrating the semantic propagation operations of the system of FIG. 1.

Referring to FIG. 6, the semantic propagation operation includes copying of selectional restrictions from SEMVPs to imperative sentences (step 140). If a SEMNP is being used as a locative expression, its goodness is evaluated against semantic constants defining good locations (step 142). If a rule involves a conjunction of two SEMNPs (detected because of ANDing together of syntactic features), the graph maker ANDs together the semantic features and applies the semantic distance expert (step 144).

If, in the course of examining the rules specified for syntactic feature propagation, the graph maker locates a "head" SEMNP which gets propagated to a higher level (e.g., it becomes part of a SEMNP that includes more words), it propagates semantic features as well (step 146). However, if the "head" is a partitive word (e.g., "portion," "part"), it propagates from a SEMNP to the left or right instead. SEMVPs and SEMADJs are propagated in the same way, with the only exception being that SEMVPs and SEMADJs do not have any partitive situations (step 148). Adjectives are part of the SEMVP class for this purpose.

When a SEMVP is made from a rule including VERBs, the graph maker propagates upward the VERB's subject restriction unless the VP is a passive construction, in which case the VERB's first object restriction is propagated instead (step 150). In any rule containing SEMVPs, it attempts to apply the selectional restrictions of the SEMVPs to NPs encountered moving leftward from the SEMVP (step 152). In any rule containing SEMADJs, the graph maker attempts to apply the selectional restriction of the SEMADJ first to any SEMNPs encountered moving to the right from the SEMADJ, and if that fails, tries moving to the left (step 154).

For any remaining unused object selectional restrictions of a VERB (that have not been propagated upward because of passives), the graph maker applies them in turn to SEMNPs encountered in order to the right of the VERB (step 156). In all of these rules, a verb selectional restriction is used up as soon as it applies to something. In all rules up to this one, SEMNPs are not used up when something applies to them. Starting at this rule, the SEMNP does get "used up". Finally, if a rule makes a SEMVP, the graph maker determines if there are any SEMVPs or SEMADJs in it that have not yet been used, and if so, propagates them upward (step 158).

The system also performs feature matching of linguistic features. Linguistic features are properties of words and other constituents. Syntactic feature matching is used by the parser, and semantic feature matching is used by the graph maker. But the same techniques are used for both. For instance, "they" has the syntactic feature plural, while "he" has the feature of singular. Feature matching uses marking on grammar rules so that they only apply if the features of the words they are to apply to meet certain conditions. For example, one rule might be:

S=NP{@}+VP{@} where the @ signs mean that the number features of the NP and VP must match. So while this rule will allow "they are" and "he is", it will not allow "they is" and "he are".

Feature match restrictions are broken into "local" and "long distance". The long distance actions may be computed when the grammar is compiled, rather than when actually processing a sentence. The sequence of long distance operations that must be performed is then encoded in a series of instruction bytes.

The computation of long distance feature operations must start with an n-ary rule (i.e., one that may have more than two inputs on its right). The system then distributes codes to various binary rules so that feature sets end up being propagated between rules in the correct fashion. By breaking the n-ary rules into binary rules, the parsing operations are greatly simplified, but because the system keeps track of feature sets across binary rules, it retains the power of the long distance operations.

The system of the invention also allows multiword "idioms" as part of the dictionary, while retaining representations of the individual words of which they are composed. These two forms may ultimately compete against each other to be the best representation. For instance "black sheep" is found in the dictionary with the meaning of a disfavored person. But in some cases the words "black sheep" may refer to a sheep which is black. Because both of the forms are retained, this non-idiomatic usage may still be chosen as the correct translation.

The idioms may belong to further categorizations. For example, the system may use the following three types:
Almighty: United States of America
Preferential: long ago
Normal: black sheep Almighty idioms suppress any other possible interpretation of any of the words that make up the sequence. Preferential idioms suppress other constituents of the same general type and that use the very same words. Normal idioms compete on an even footing with other entries.

The resulting graph is to be evaluated by experts (step 108, FIG. 3), which provide scores that express the likelihood of correctness of interpretations in the graph. The system of the invention includes a scoring method that applies to all partial sentences of any length, not just full sentences. An important element in the use of a graph is that a subtree is fully scored and analyzed only once, even though it may appear in a great many sentences. For example, in the phrase "Near the bank there is a bank.", the phrase "Near the bank" has at least two meanings, but the best interpretation of that phrase is determined only once. The phrase "there is a bank" similarly has two interpretations, but the best of those two is determined only once. There are therefore four sentence interpretations, but the subphrases are scored just once. Another feature of the graph is that each node is labeled with easily accessible information about the length of that piece of the sentence. This allows the best N interpretations of any substring of the English sentence to be found without reanalyzing the sentence.

Although, in one implementation, only the N overall best analyses of the sentence are available at any one time (N being a number on the order of 20), the use of a graph allows the system to integrate the result of a user choice about a smaller constituent and give a different N best analyses that respect the user's choice. Because all this is done without reparsing the sentence or rescoring any substrings, it may be done quickly.

Figure 8:
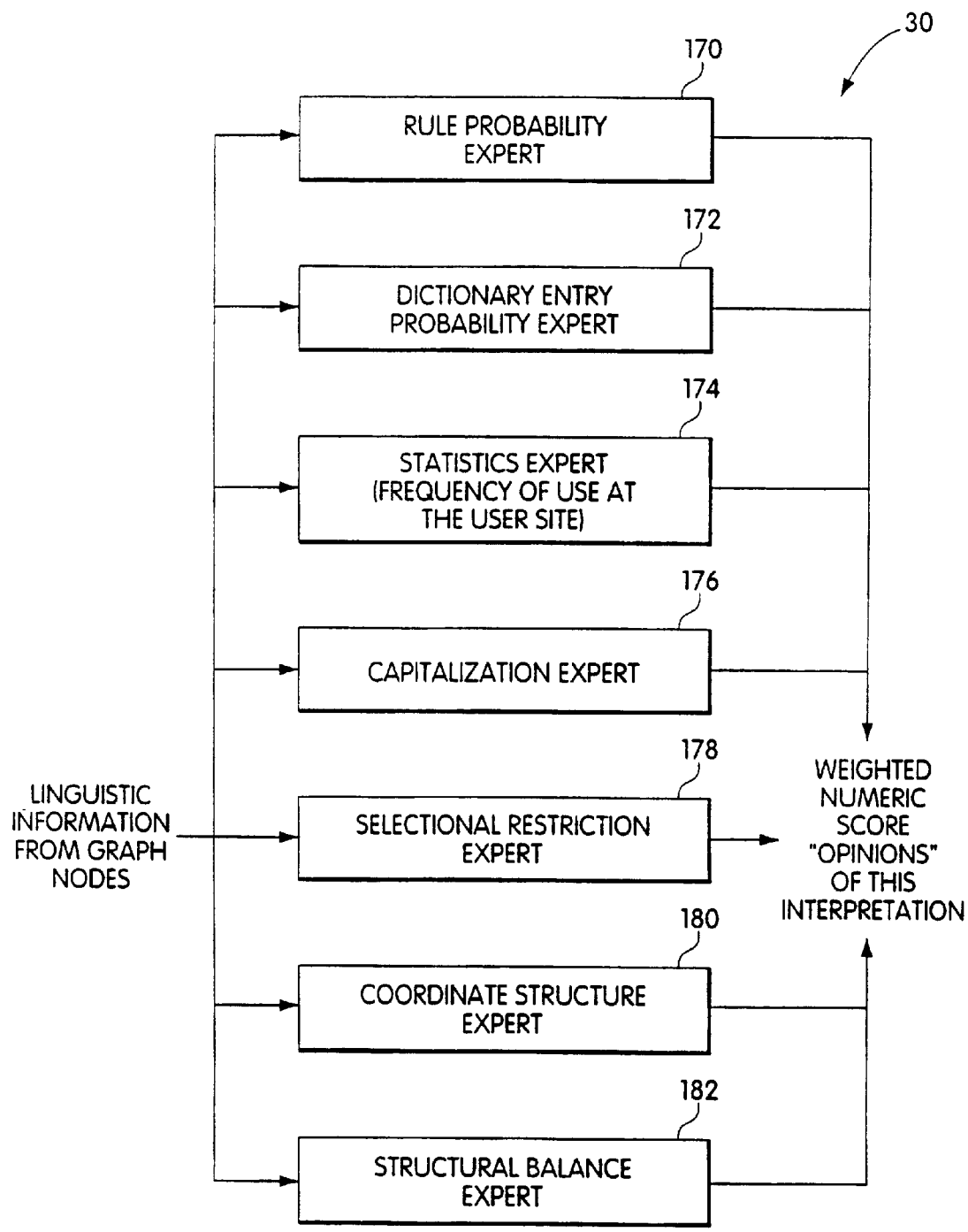
FIG. 8 is a flow diagram illustrating the expert evaluator of the system of FIG. 1.

Referring to FIG. 8, operation of the expert evaluator 30 is based on various factors that characterize each translation, which are handled by the various experts. The rule probability expert 170 evaluates the average relative frequency of grammar rules used to obtain the initial source language parse tree. The selectional restriction expert 178 evaluates the degree of semantic accord of the given translation. The dictionary entry probability expert 172 evaluates the average relative frequency of particular "parts of speech" of the words in the sentence used to obtain the initial source language parse tree. The statistics expert evaluates the average relative frequency of particular paraphrases chosen for the given translation.

The system automatically determines the English "part of speech" (POS) for various individual English words, English phrases, and groups of English words. The system makes the automatic determination of the POS when translating sentences, and the system usually makes the correct choice. Occasionally, however, the sentence being translated is itself ambiguous. A word or phrase that can be interpreted as more than one POS leads to several distinct but "correct" meanings in which the sentence in which the word or phrase appears. It is possible for an operator of the system to override the system's automatic POS determination and instead manually set the POS for any word, phrase, or group of words. For example, in the source English sentence "John saw a boy with a telescope", an operator of the system can set "a boy with a telescope" as a Noun Phrase to force the system to interpret the sentence to mean that the boy was carrying a telescope and thus reject the interpretation that John used a telescope to see the boy. An operator can address the situation where overriding the system's POS rules yields worse, not better, translation results by applying a few manual POS settings as possible or by applying less restrictive manual POS settings. Noun Phrase is less restrictive than Noun, and Group is the least restrictive POS setting. The following is a list of the various possible POS settings.

PART OF SPEECH (POS)

Noun
Noun Phrase
Verb (transitive or intransitive)
Verb Phrase
Adjective
Adjectival Phrase
Adverb
Adverbial Phrase
Preposition
Prepositional Phrase
Conjunction
Group
English The parts of speech "Adjectival Phrase" and "Adverbial Phrase" are useful in the situation where an English sentence may have a different meaning depending on how a particular prepositional phrase is interpreted by the system. For example, the sentence "We need a book on the fourth of July" means "We need a book about the American fourth of July holiday" if "on the fourth of July" has an adjectival interpretation, but the sentence means "On the fourth day of July, we need a book" if the phrase "on the fourth of July" has an adverbial interpretation. If the operator believes the system has automatically assigned the incorrect POS to "on the fourth of July", the operator can manually set a different POS to "on the fourth of July" in the sentence "We need a book on the fourth of July". If an operator does not want the system to translate a particular word, phrase, or group of words from English to Japanese, the operator can assign the POS "English" to the desired word(s), phrase(s), and/or group(s) of words. It also is possible for an operator to remove one or more POS settings, regardless whether the settings were assigned automatically by the system or manually by an operator.

The system keeps track of statistical information from translation usage at each customer site at more than one level. For example, the system may maintain statistical counts at the surface form level (how often was "leaving" used as a transitive versus an intransitive verb), and also at the meaning level (did it mean "leave behind" or "depart" from), and this second type is summed over occurrences of "leave", "leaves", "left", and "leaving". The system may also keep statistical counts separately for uses that have occurred within the last several sentences, and uses that have occurred at any time at the customer site. Furthermore, the system may distinguish cases where the user intervened to indicate that a particular word sense should be used, from cases where the system used a particular word sense without any confirmation from the user.

The structural balance expert 182 is based on a characteristic of English and many other European languages pertaining to the lengths of constituents in a given sentence. In some (but not all) constructions, sentences which involve heavy (lengthy) elements to the left of light elements are disliked in these languages. For example:

---

Mary hit Bill with a broom.
    Light  Heavy
{acceptable}
Mary hit with a broom Bill.
    Heavy        Light
{unacceptable}
Mary hit with a broom a dog that tried to bite her.
    Heavy         Heavier
{acceptable}

---

Given two parses of a given sentence, if one contains a "Heavy-Light" sequence involving a construction that tends to avoid such a sequence, and if the other parse does not, then it can be assumed that the former does not represent the intended interpretation of the sentence. This expert is an effective way to distinguish between intended parses and unintended parses.

In coordinate structures of the pattern of "A of B and C" it can be difficult to determine whether the intended interpretation is "A of {B and C}" or "A {of B} and C". The coordinate structure expert 180 measures the semantic distance between B and C, and that between A and C to determine which mode of coordination combines two elements that are closer in meaning. This expert accesses the semantic feature tree during its operation. This expert is also an efficient way to distinguish between the intended parses and the unintended parses of a given sentence.

Many words in English include potential ambiguities between ordinary-noun and proper-name interpretations. The capitalization expert 176 uses the location of capitalization in a sentence to determine how likely it is that the capitalization is significant. For example, the following sentences:

Brown is my first choice.
My first choice is Brown.
are different in that while the former is genuinely ambiguous, it is far more likely in the latter that "Brown" is a person name than a color name. This expert takes into consideration factors such as whether a given capitalized word appears at sentence-initial or sentence-noninitial position (as shown above), whether the capitalized spelling is in the dictionary, and whether the lower-case-initial version is in the dictionary. This expert is an effective way to obtain the correct interpretations of capitalized words in sentences.

If a sentence contains a sequence of initial-uppercase words, it can be treated as a proper name or as a sequence of ordinary nouns. The system of the invention employs a capitalized sequence procedure, which favors the former interpretation. Also, if the sequence cannot itself be parsed by normal grammar rules, it can be treated as a single unanalyzed noun phrase to be passed through untranslated. This procedure has proven to be a very effective way of dealing with multiple-word proper names while not completely ignoring the lower-rated common noun interpretations.

Figure 7:
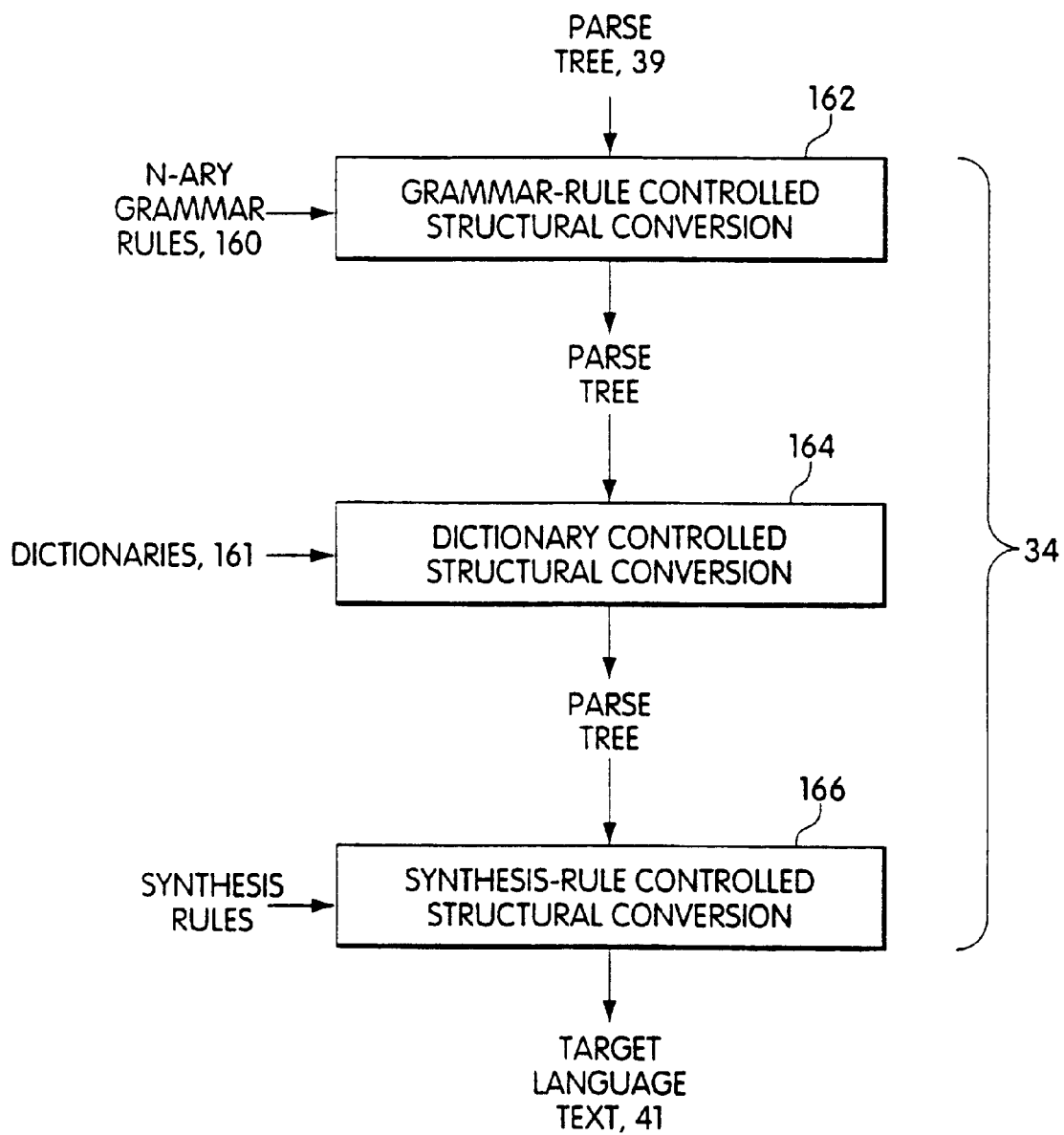
FIG. 7 is a flow diagram illustrating the structural conversion operations of the system of FIG. 1.

Referring to FIG. 7, the machine translation system of the invention uses a grammar-rule controlled structural conversion mechanism 162 that has the efficiency of a straightforward grammar-rule-based structural conversion method, but which comes close to the power of the template-to-template structural conversion method. This method relies on the use of grammar rules 160 which can specify non-flat complex substructure. While the following is a rule format used in other translation systems:

$Y \Rightarrow X1 + X2 + \ldots Xn$

Substructure Specified

Y

X1  X2...  Xn the system of the invention uses grammar rules of the following format:

$Y \Rightarrow \#Z1(i)\#Z2(2)X1 + X2 \ldots + Xi + X(i+1) + \ldots X(n)$

Substructure Specified

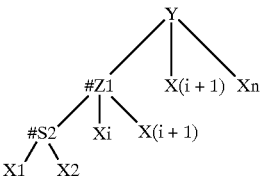

In this syntax, symbols prefixed with "#" are virtual symbols that are invisible for the purpose of sentence structure parsing, but which are used in building substructures once a given parse is obtained.

Given this type of grammar, it becomes possible to specify multiple structure conversion among any sequences of nodes that are siblings in the substructure. This transforms a grammar-rule-based structure conversion mechanism into one with some of the power of the template-to-template structure conversion mechanism. Although the system of the invention is based on the second type of grammar rules presented above, it automatically compiles the corresponding grammar rules of the first form. It can therefore use grammar rules of the first form to parse sentences, and use grammar rules of the second form to build parse structures.

The structural conversion also includes a dictionary controlled structural conversion operation 166, which accesses dictionaries 161 to operate on the parse tree after it has been operated upon by the grammar-rule controlled structural conversion operation. The synthesis-rule controlled structural conversion operation then applies synthesis rules to the resulting parse tree to provide the target language text 41.

Referring again to FIGS. 1 and 2, after the system has derived a best-ranked translation in the process described above, it is presented to the user via the display 20. The user then has the option of approving or editing the translation by interacting with the alternate parse system 37, via the user input device 22. In the editing operation, the user may constrain portions of the translated sentence that are correctly translated, while requesting retranslation of the remaining portions of the sentence. This operation may be performed rapidly, since the system retains the graph with expert weights 31.

Having described certain details of the automated natural language translation system with reference to FIGS. 1–9. Two improvements according to the invention are now described with reference to FIGS. 10 and 11, respectively.

Figure 10:
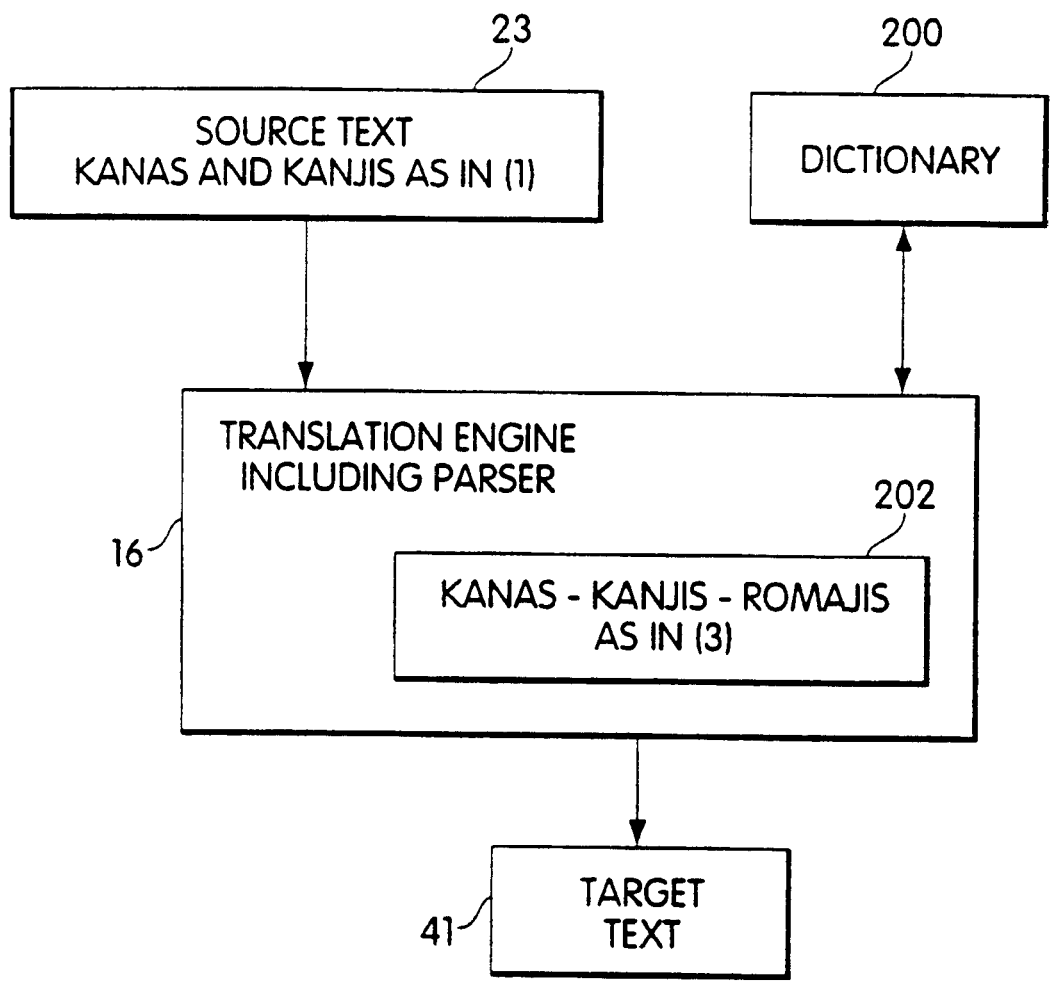
FIG. 10 is a diagram of a system which transforms kanas in the input text into alphabetic letters to allow the presence of a word or phrase boundary to be recognized in the middle of a kana, according to a first aspect of the invention.

Referring to FIG. 10, in accordance with one aspect of the invention, the translation engine 16 of the automated natural language translation system 10 receives source text 23 and automatically translates it into target natural language text 41, which translation is affected by parsing that transforms some or all kanas in the source text 23 into alphabetic letters of the source natural language. This is for the purpose of making it possible to assume the presence of a morpheme (i.e., the smallest linguistic unit that has meaning) boundary in the middle of a kana in a given input sentence. In a preferred embodiment, the source language is Japanese, and the target language is English. In general, any source natural language that uses ideograms and syllabic characters and whose orothgraphy lacks identifiers marking word and phrase boundaries can be processed and translated according to this aspect of the invention. Thus, references to Japanese in describing this aspect of the invention should not be construed as limiting. The Japanese orothgraphy (i.e., writing system) includes the use of kanjis and kanas. Kanjis are ideograms which each has some semantic content. Kanas are syllabic characters which each represents a sound without any inherent meaning. In Japanese, alphabetic letters are known as romajis.

The reason why it is desirable to be able to assume the presence of a morpheme boundary in the middle of a kana in a given input sentence when translating Japanese (or other source language as indicated in the preceding paragraph) to English will become apparent from the following description which uses an example.

The Japanese sentence that means "She didn't write letters." is as follows, where each kanji is in pointer brackets (i.e., "< >") and each kana is in curly brackets (i.e., "{ }"):
(1) <kano><zyo>{ha}<te><gami>{wo}<ka>{ka}{na}{ka}{TU}{ta}.

The grammar rules and dictionary organization can be greatly economized (as explained hereinafter) when it is recognized that the string in (1) consists of the following morphemes, where a morpheme boundary is designated by a hyphen and where the organization of a dictionary 200 is given in Table 1:
(2) <kano><zyo>-{ha}-<te><gami>-{wo}-<ka>{k-a}{na}{k-a}{TU}{ta}.

TABLE 1

Dictionary Entries for Example

| Dictionary Entry | Meaning | Part of Speech |
| --- | --- | --- |
| <kano><zyo> | she | Pronoun |
| {ha} | Topic Marker | Particle |
| <te><gami> | letter | Noun |
| {wo} | Object Marker | Accusative |
| <ka>{k a}{na}{k a}{TU}{ta} | (to) write not Past Tense | Verb.Stem NEG.Adj.Past Past |

However, as can be seen from Table 1, morpheme boundaries can show up in the middle of kanas, and unless kana {ka} is represented alphabetically as (k)(a), the above identification of morphemes is not possible.

In accordance with the invention, the Japanese input string shown in (1) is transformed into the following by a parser in the translation engine 16, where a character that is recognized as an alphabetic letter is shown in regular parentheses (i.e., "( )"):

(3) <kano><zyo>{ha}<te><gami>{wo}<ka>(k)(a)(n)(a)(k)(a){TU}(t)(a)

As seen in (3), kanas {ka}, {na}, and {ta} in the original Japanese orthography have been transformed into romaji (k)(a), (n)(a), and (t)(a), respectively, because a morpheme boundary might have to be recognized between the initial consonant and the vowel. In contrast, kanas {ha}, {wo}, and {TU} have been retained as kanas because there is no possibility in Japanese for a morpheme boundary to show up in the middle of these three particular kanas.

In general, the usefulness of converting kana-kanji Japanese text 23 into kana-kanji-romaji text 202 is not limited to machine translation. It extends to any automatic Japanese language processing systems which involve identification of morphemes. Such systems can include information retrieval systems for retrieving, for example, all occurrences of "to write."

As indicated previously, the kana-kanji-romaji representation of Japanese sentences economizes the grammar rules and the dictionary organization needed by the system to perform the Japanese-to-English translation. The following is an explanation of that economization. Table 2 gives an example of a partial paradigm of verb inflections in Japanese, where the verbs write, extinguish, stand, and die are used in the example.

TABLE 2

Verb Inflections for Example

|  | write | extinguish | stand | die |
|---|---|---|---|---|
| Negation | <ka>{ka}{na} | <ke>{sa}{na} | <ta>{ta}{na} | <si>{na}{na} |
| Gerund | <ka>{ki} | <ke>{si} | <ta>{ti} | <si>{ni} |
| Present | <ka>{ku} | <ke>{su} | <ta>{tu} | <si>{nu} |
| Conditional | <ka>{ke}{ba} | <ke>{se}{ba} | <ta>{te}{ba} | <si>{ne}{ba} |
| Cohortative | <ka>{ko}{u} | <ke>{so}{u} | <ta>{to}{u} | <si>{no}{u} |

When referring to Table 2, note that there are altogether eleven distinctive patterns (columns) of inflection, only four of which are shown in this table. Also note that a gerund is, for example, "(He began) writing . . . " or "(He began) extinguishing . . . " and that a cohortative is, for example, "Let's write . . . " or "Let's extinguish . . . ." In a writing system such as Japanese in which kanas are indivisible orthographic atomic units, there are two known ways of dealing with the rich inflectional system illustrated above in Table 2.

The first alternative is identified in Table 3 below. For each verb of the patterns under discussion, the dictionary must contain five distinct stem forms.

TABLE 3

Dictionary Entries for Alternative 1

|  | write | extinguish | stand | die |
|---|---|---|---|---|
| Negation | <ka>{ka} | <ke>{sa} | <ta>{ta} | <si>{na} |
| Gerund | <ka>{ki} | <ke>{si} | <ta>{ti} | <si>{ni} |
| Present | <ka>{ku} | <ke>{su} | <ta>{tu} | <si>{nu} |
| Conditional/Potential | <ka>{ke} | <ke>{se} | <ta>{te} | <si>{ne} |
| Cohortative | <ka>{ko}{u} | <ke>{so}{u} | <ta>{to}{u} | <si>{no}{u} |

For this first alternative,

Negation Suffix={na}

Gerund Suffice=zero

Conditional Suffix={ba}

Potential Suffix=zero

Cohortative Suffix=zero

The second alternative is identified in Tables 4 and 5 below.

TABLE 4

Dictionary Entries for Alternative 2

|  | write | extinguish | stand | die |
|---|---|---|---|---|
| Stem Type | Type.K | Type.S | Type.T | Type.N |
| Stem | <ka> | <ke> | <ta> | <si> |

TABLE 5

Suffixes for Alternative 2

|  | Type.K | Type.S | Type.T | Type.N |
|---|---|---|---|---|
| Negation | {ka}{na} | {sa}{na} | {ta}{na} | {na}{na} |
| Gerund | {ki} | {si} | {ti} | {ni} |
| Present | {ku} | {su} | {tu} | {si}{nu} |

TABLE 5-continued

Suffixes for Alternative 2

|  | Type.K | Type.S | Type.T | Type.N |
|---|---|---|---|---|
| Conditional | {ke}{ba} | {se}{ba} | {te}{ba} | {ne}{ba} |
| Potential | {ke} | {se} | {te} | {ne} |
| Cohortative | {ko}{u} | {so}{u} | {to}{u} | {no}{u} |

According to this second alternative, it is necessary to enter only one stem form for each verb. On the other hand, eleven sets of inflectional endings (e.g., the Type.K set, Type.S set, etc.) will have to be recognized, and the grammar rules need to specify which of these sets can follow which of the stem types. Since a given Japanese verb can inflect in several hundred ways, the grammar rules with respect to which stem types can combine with which suffix types can get extremely complex.

In contrast to the two known alternatives for dealing with the rich inflectional system illustrated in Table 2, the kana-kanji-romaji representation of Japanese sentences according to the invention allows the inflectional patterns to be described in a unique and simple yet powerful manner. In accordance with the invention, the dictionary entries are:

|  | "write" | "extinguish" | "stand" | "die" |
| --- | --- | --- | --- | --- |
| Stems | <ka>(k) | <ke>(s) | <ta>(t) | <si>(n) | and the suffixes are:

Negation: (a)(n)(a)

Gerund: (i)

Present: (u)

Conditional: (e)(b)(a)

Potential: (e)

Cohortative: (o)(u)

As shown, with the invention, the dictionary needs only one stem for each verb and there is only one set of suffixes. Thus, the economization of grammar rules and dictionary organization in accordance with the invention has been described.

Figure 11:
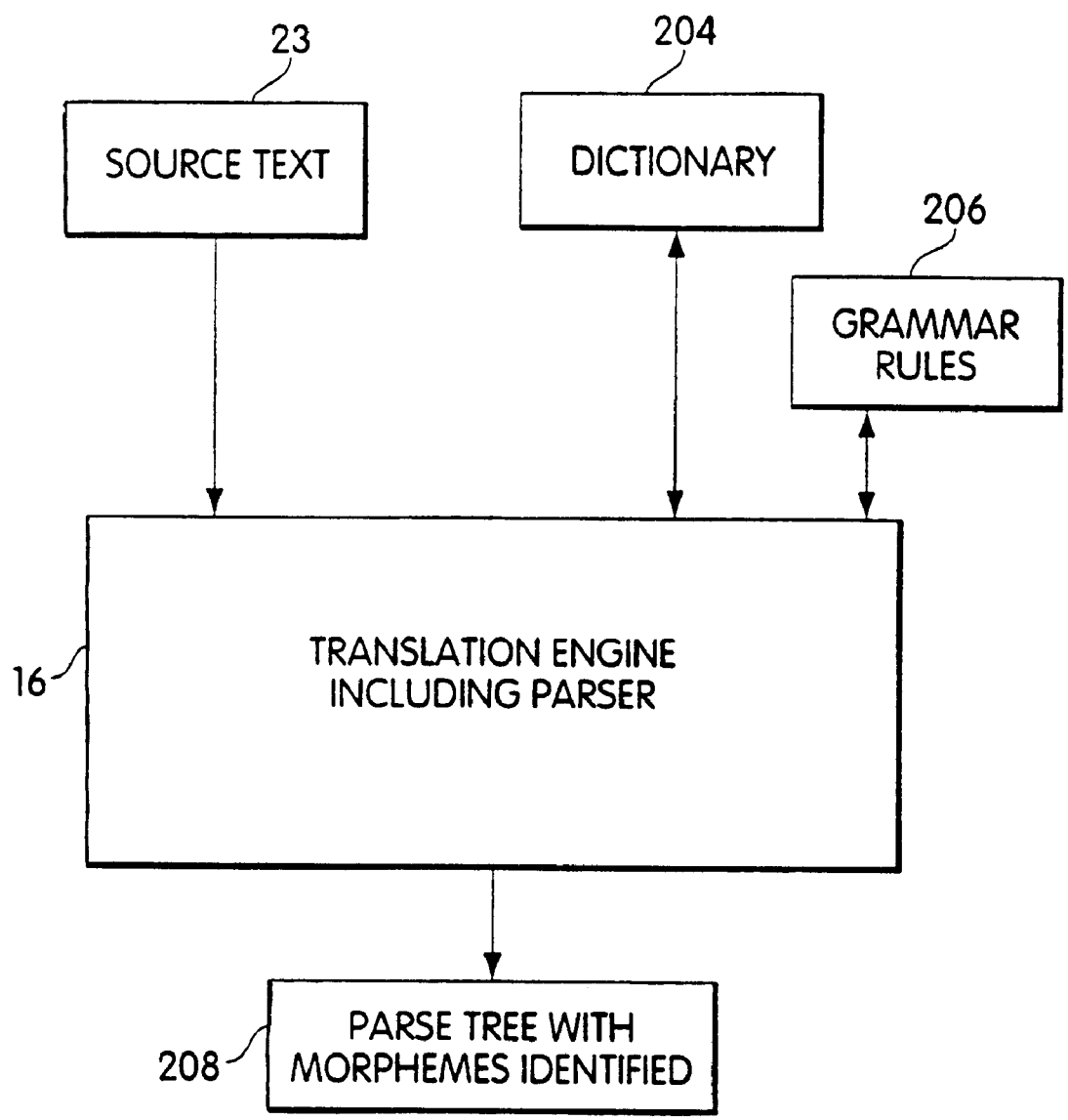
FIG. 11 is a diagram of a system which performs on the input text a morphological analysis and a syntactic analysis concurrently, in accordance with a second aspect of the invention.

Referring to FIG. 11, in accordance with another aspect of the invention, the translation engine 16 of the automated natural language translation system 10 receives source text 23 and automatically translates it into target natural language text 41, which translation is affected by a parser that performs morphological and syntactic analyses concurrently on the source input text 23. In a preferred embodiment, the source language is Japanese, and the target language is English. In general, any source natural language whose orthography lacks identifiers marking word and phrase boundaries (e.g., Japanese, Korean, and Chinese) can be processed and translated according to this aspect of the invention. The task of parsing sentences of languages such as Japanese, Korean, and Chinese can be compared to the task of parsing English sentences that are spelled without blank spaces between words. This analogy will be used herein to aid in understanding this aspect of the invention.

Before this aspect of the invention is described, it may be helpful to describe the standard approach to the analysis of continuous texts. The problem is how to obtain (b) given (a), where (a) and (b) are as follows:

(a) shedidnotwritethatletter.

(b) she did not write that letter.

The standard approach to parsing (a) to get (b) is based on the notion of the "longest match". Given (a), finding the longest dictionary entry that matches the head of the string is the goal. If it is assumed that "shed" is in the dictionary, that string (i.e., "shed") is removed from the input string, and the longest match search is repeated for the remainder of the string:

| Matched Substring | Remaining Substring |
| --- | --- |
| shed | idnotwritethatletter. |

Now assume that there is no entry in the dictionary that matches the head (of any length) of the "remaining substring." It is now realized that it was a mistake to assume that the initial input string contained "shed." It is placed back into the remainder substring, thus restoring the original input string: "shedidnotwritethatletter." A search of the second longest match is then carried out, and the following identification is made in this additional searching:

| Matched Substring | Remaining Substring |
| --- | --- |
| she | didnotwritethatletter. |

When the longest match search is carried out on the remaining substring, the following match results:

| Matched Substring | Remaining Substring |
| --- | --- |
| she did | notwritethatletter. |

The next longest match search produces:

| Matched Substring | Remaining Substring |
| --- | --- |
| she did not | writethatletter. |

The morphological analysis (or segmentation) of the original continuous input string (a) is completed when the remaining substring becomes null, in which instance the matched substring will be:

she did not write that letter.

Having described generally the basics of the standard approach to the analysis of continuous texts, it will now be described how the standard approach also requires grammatical information. Assume that the input string is:

shewritesletters.

After "she" and "write" are identified as the first two longest matching substrings, the following situation occurs (assuming that "write" is in the dictionary but not "writes").

| Matched Substrings | Remaining Substring |
| --- | --- |
| she write | sletters. |

The initial letter "s" is clearly a third-person singular present-tense suffix and is not the first letter of a new word. This fact can be identified only if it is recognized that the previously identified "write" is a verb and that the dictionary form of a verb can be followed by "s". With this grammatical information, the substrings can be changed to:

| Matched Substrings | Remaining Substring |
|---|---|
| she write-s | letters. |

Next, "letter" is identified as the longest match, yielding:

| Matched Substrings | Remaining Substring |
|---|---|
| she write-s letter | s. |

Again, "s" of the remaining substring is clearly not the beginning of a new word, but the plural ending suffix of the previously identified noun "letter". With this kind of grammatical information included in the morphological analysis component, we can finally succeed in segmenting the input string:

| Matched Substrings | Remaining Substring |
|---|---|
| she write-s letter-s. | |

Note that pieces of grammatical information that have been shown to be necessary for the morphological analysis of the input string are also needed for the parsing of the string. Thus, the same rules needed to be stated twice, once in the morphological analysis component, and the second time in the syntactic analysis component.

Referring again to FIG. 11, in accordance with this second aspect of the invention in which the parser of the translation engine 16 performs morphological and syntactic analyses concurrently on the source input text 23, assume that the input string is:

shedidnotwritethatletter.

The task of the parser is to accept the input string (which is really a string of Japanese, or similar language, characters) recognize morpheme/word boundaries, and produce a parse tree for the sentence that might look like the following:

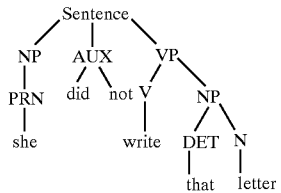

where NP is noun phrase, AUX is auxiliary verb, VP is verb phrase, PRN is pronoun, V is verb, DET is determiner, and N is noun.

As described above, the standard approach to this task is to carry out a heuristic morpheme/word boundary identification pass first, and then to carry out a syntactic pass with the identified morphemes/words as units. That is, with known systems, the input string would first go through a morphological analysis component that identifies morpheme/word boundaries which would yield:

she did not write that letter.

and this segmented sentence would then be used as input to a syntactic analysis component. The problem with this known approach is that the morphological analysis component must depend upon grammatical information, and therefore, there is much redundancy between the rules used for that component and the rules that are used for the syntactic component. It is also the case that it is not always easy to make the two components consistent with each other.

According to the second aspect of the invention in which the parser of the translation engine 16 performs morphological and syntactic analyses concurrently on the source input text 23, each orthographic unit (e.g., "s", "h", "e", etc.) is treated as if it were a word, and thus the input string has "s" as a word, "h" as a word, "e" as a word, "d" as a word, etc. The entry in the dictionary 204 for the English word "she" thus is a multi-word entry "s h e". The sequence "s h e" in the input string will match this multiple-word dictionary entry in the same way as, say, "in front of" in a regular English input string would match a multi-word idiom entry "in front of" in the regular dictionary. Thus, the dictionary 204 for parsing the unsegmented input string would be an all-idiom dictionary (except for entries for single-letter words such as "a" in English).

The parsing of the unsegmented input sentence is completed when a set of parses for the sentence is obtained. In each parse, matched dictionary entries (i.e., "multi-word idioms") represent morphemes. Thus, morphological analysis of the input string is completed concurrent with the completion of the parsing of the string with grammar rules.

As an illustration of this second aspect of the invention consider the following. Japanese is a proto-typical example of a language whose orthography does not mark word and phrase boundaries, and thus it will be used in the following example. Assume that the original input string is:

<kano><zyo>{ha}<te><gami>{wo}<ka>{ka}{na}{ka}{TU}{ta}.

This is, as before, equivalent to "shedidnotwritethatletter." in English. The standard two-step approach (described above) first carries out a morphological analysis of this string. Such an approach might identify the following sequence of morphemes:

<kano><zyo>-{ha}-<te><gami>-{wo}-<ka>{ka}-{na}{ka}{TU}-{ta}

"she" topic-marker "letter" object-marker "write" negative past tense

As described previously, in accordance with the invention, the grammar rules and dictionary organization can be greatly economized if it is recognized that the string contains the following morphemes:

<kano><zyo>-{ha}-<te><gami>-{wo}-<ka>{k-a}{na}{k-a}{TU}{ta}.

TABLE 6

Dictionary Entries for Example

| Dictionary Entry | Meaning | Part of Speech |
|---|---|---|
| <kano><zyo> | she | Pronoun |
| {ha} | topic marker | Particle |
| <te><gami> | letter | Noun |
| {wo} | object marker | Accusative |
| <ka>{k a}{na}{k a}{TU}{ta} | (to) write not past tense | Verb.Stem NEG.Adj.Past Past |

As can be seen from Table 6, morpheme boundaries can show up in the middle of kanas, and unless kana (ka) is represented alphabetically as (k)(a), the above identification of morphemes is not possible. The Japanese input string is transformed into the following by a parser in the translation engine 16, where a character that is recognized as an alphabetic letter is shown in regular parentheses (i.e., "( )"):

<kano><zyo>{ha}<te><gami>{wo}<ka>(k)(a)(n)(a)(k)(a){TU}(t)(a)

Thus, kanas {ka}, {na}, and {ta} in the original Japanese orthography have been transformed into romaji (k)(a), (n)(a), and (t)(a), respectively, because a morpheme boundary might have to be recognized between the initial consonant and the vowel. In contrast, kanas {ha}, {wo}, and {TU} have been retained as kanas because there is no possibility in Japanese for a morpheme boundary to show up in the middle of these three particular kanas.

Assume that the following grammar rules 206 exist in accordance with the invention:

Rule 1: S=NP.ha+VPtensed
Rule 2: NP.ha=NP+Particle.ha
Rule 3: NP=Pronoun
Rule 4: NP=Noun
Rule 5: NP.wo=NP+Accusative
Rule 6: VP=NP.wo+Vt.k.Stem
Rule 7: VPtensed=VP+NEG.Adj.Past+Past
Rule 8: NEG.Adj.Past=(a)(n)(a)(k)

With the invention, the input string

<kano><zyo>{ha}<te><gami>{wo}<ka>(k)(a)(n)(a)(k)(a){TU}(t)(a)

is used as input to the parser of the translation engine 16. The dictionary illustrated in Table 6 is a "multi-word" idiom dictionary 204 according to the invention. The parser then produces the following parse tree 208:

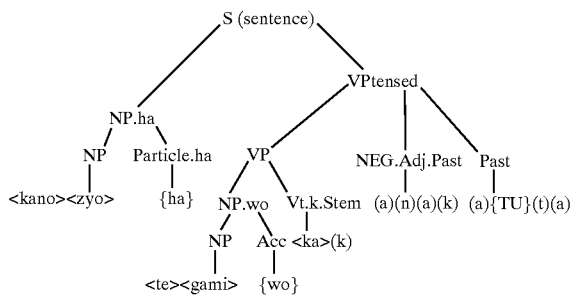

In accordance with the invention, the morphological analysis thus is completed concurrent with the completion of the syntactic parsing of the input string. That is, a sequence of characters at the bottom of the parse tree that is dominated by a single syntactic category constitutes a morpheme.

All of the above-described functions and operations may be implemented by a variety of hardwired logic design and/or programming techniques for use with a general purpose computer. The steps as presented in the flowcharts generally need not be applied in the order presented, and combinations of the steps may be combined. Similarly, the functionality of the system may be distributed into programs and data in various ways. Furthermore, it may be advantageous to develop the grammar and other operative rules in one or more high level languages, while supplying them to end users in a compiled format.

Any of the embodiments of the automated natural language translation system described herein, including all of the functionality described herein, can be provided as computer software on a computer-readable medium such as a diskette or an optical compact disc (CD) for execution on a general purpose computer (e.g., an Apple Macintosh, an IBM PC or compatible, a Sun Workstation, etc.).

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An automated natural language processing system, comprising:
    computer storage means;
    means for receiving input textual information in a source natural language and for storing the input textual information in the computer storage means, the input textual information including kanjis and kanas wherein kanjis are ideograms which each has some semantic content and kanas are syllabic characters which each represents a sound without any inherent meaning, the source natural language being one whose orthography lacks identifiers marking word and phrase boundaries; and
    a translation engine for accessing the computer storage means and for translating the input textual information in the source natural language into output textual information in a target natural language, the translation engine including a parser for parsing the input textual information as a step in the translation process, the parser parsing the input textual information by transforming at least some of the kanas in at least a portion of the input textual information into alphabetic letters of the source natural language thereby allowing the presence of a word or morpheme boundary to be recognized in the middle of a kana.

2. The system of claim 1 wherein the source natural language is Japanese and the target natural language is English.

3. An automated natural language processing system, comprising:
    computer storage means;
    means for receiving input textual information in a source natural language and for storing the input textual information in the computer storage means, the source natural language being one whose orthography lacks identifiers marking word and phrase boundaries; and
    a translation engine for accessing the computer storage means and for translating the input textual information in the source natural language into output textual information in a target natural language, the translation engine including a parser for parsing the input textual information as a step in the translation process, the parser parsing the input textual information by performing concurrently on at least a portion of the input textual information a morphological analysis and a syntactic analysis.

4. The system of claim 3 further comprising:
    a plurality of grammar rules stored in the computer storage means; and
    a dictionary including a plurality of entries, the dictionary being stored in the computer storage means;
    wherein the parser applies the grammar rules to at least a portion of the input textual information to perform concurrently the morphological and syntactic analyses.

5. The system of claim 4 wherein the source natural language is Japanese and the target natural language is English.

6. The system of claim 4 wherein the source natural language is Korean and the target natural language is English.

7. The system of claim 4 wherein the source natural language is Chinese and the target natural language is English.

8. An automated method of processing source natural language to provide target natural language, comprising:

receiving input textual information in the source natural language, the input textual information including kanjis and kanas wherein kanjis are ideograms which each has some semantic content and kanas are syllabic characters which each represents a sound without any inherent meaning, the source natural language being one whose orthography lacks identifiers marking word and phrase boundaries; and translating the input textual information using a translation engine from the source natural language to output textual information in the target natural language, the translation engine including a parser for parsing the input textual information as a step in the translation process, the parser parsing the input textual information by transforming at least some of the kanas in at least a portion of the input textual information into alphabetic letters of the source natural language thereby allowing the presence of a word or morpheme boundary to be recognized in the middle of a kana.

9. The automated method of claim 8, wherein translating further includes:

(a) converting one or more input characters of the input textual information, which each have an original orthographical representation, into a hybrid representation of the input textual information and including unchanged original characters and derived alphabetic representations, before application of any analytical procedures to the input characters of the input textual information; and (b) comparing the hybrid representation of the input textual information to entries in a dictionary having entries which are in substantially the same hybrid representation as the original characters and derived alphabetic representations.

10. The automated method of claim 9, wherein converting one or more input characters of the input textual information into their derived alphabetic correspondences before application of any analytical procedures comprises converting input characters into a hybrid representation of the original orthographical characters and derived alphabetic letters.

11. An automated method for processing source natural language to provide target natural language, comprising:

receiving input textual information in the source natural language, the source natural language being one whose orthography lacks identifiers marking word and phrase boundaries; and translating the input textual information using a translation engine from the source natural language to output textual information in the target natural language, the translation engine including a parser for parsing the input textual information as a step in the translation process, the parser parsing the input textual information by performing concurrently on at least a portion of the input textual information a morphological analysis and a syntactic analysis.

12. The automated method of claim 11, wherein translating the input textual information further includes applying parsing rules to the input textual information in which each orthographic unit of at least a portion of the input textual information is treated as a word; and comparing each word to entries in a multi-word idiom dictionary such that a morphological analysis is completed with a syntactic analysis.

* * * * *